United States Patent [19]
Boyd

[11] 3,849,779
[45] Nov. 19, 1974

[54] MULTIPLE TARGET INDICATOR AND DISCRIMINATOR

[75] Inventor: William C. Boyd, Stow, Mass.

[73] Assignee: The United States of America as represented by the Secretary of the Navy, Washington, D.C.

[22] Filed: Mar. 28, 1973

[21] Appl. No.: 345,603

[52] U.S. Cl. .............................. 343/7.4, 343/16 LS
[51] Int. Cl. ............................................. G01s 9/02
[58] Field of Search .......................... 343/7.4, 16 LS

[56] References Cited
UNITED STATES PATENTS
3,090,952  5/1963  Kuck .................................. 343/7.4
3,130,402  4/1964  Kuck .................................. 343/7.4

*Primary Examiner*—T. H. Tubbesing

[57] ABSTRACT

A multiple target indicator and discriminator is provided for use on a tracking radar of the sequential lobe type. Multiple targets occurring within one radar beam-width cause the radar return signal to have a phase modulated component at the scan rate frequency and also an additional second harmonic, amplitude modulated component at twice the scan rate frequency. These modulated components are detected and removed from the radar return signal and used to provide a multiple target indicating signal. These modulated components are also used to produce an angle bias signal which, when added to an angle error signal in the radar angle track loop, causes the radar to track only one target in a formation of targets. Since the angle bias signal is developed directly from either the phase modulated component or the amplitude modulated component of the return signal produced by the multiple targets, such bias signal is responsive to any change in target reflectivity and thereby provides an adaptive angle bias signal.

10 Claims, 5 Drawing Figures

MULTIPLE TARGET INDICATOR AND DISCRIMINATOR

BACKGROUND AND SUMMARY OF THE INVENTION

The present invention relates in general to radar apparatus; and in particular to a sequential lobing radar having an angle track loop. More specifically, it relates to a target selection system for allowing a tracking radar to select a single target from a plurality of targets without the radar randomly wandering back and forth between the available targets.

The function of a tracking radar is to select a particular target and follow its course in range and angle. One of the most well-known types of tracking radar is the conical-scan type which belongs to the family of sequential lobing radars. Although the conical-scan radar was developed during World War II, it still remains in generally wide-spread use; due principally to its reliability, flexibility and simplicity. Tracking radars usually consist of a high-gain, thin-beam antenna, mounted on a pedestal having two or three degrees of freedom, which serves to aim the beam under the control of servomotors. All tracking antennas use some arrangement of offset feeds to sense the angle error of the target with respect to the tracking axis. Error data is initially derived in two coordinates normal to the beam axis, namely elevation and traverse angles, but then converted into angles referenced in a fixed coordinate system, such as azimuth and elevation. The conical-scan radar uses a single offset beam to sense the error, with the requirement that at least four pulses must be received during a complete scan cycle, so that direction and magnitude of the error in both tracking coordinates may be determined.

A major shortcoming common to all types of tracking radars, however, is the inability to resolve a single target when confronted with a multiple of targets in close proximity with one another in a horizontal or vertical formation. When confronted with such situation the radar will become confused and will randomly select one of the multiple of targets thereby producing noisy tracking and generally insufficient target information. In actuality another problem will be encountered, namely once a target is in track it will normally fade or vary in reflectivity thereby causing the radar to break track and start looking for another target to track in the same vicinity. This second target will of course also change in reflectivity and the radar will again break track and swing to either the original target or still another target. The result of this multiple target situation is that the radar will wander from target to target and provide almost no useful information about any of the targets. Various solutions to this multiple target problem have been proposed and have achieved varying degrees of success. One such solution was a system for tracking only one edge or extremity of a multiple target formation rather than attempting to follow an individual target. Another solution which was applied to conical-scan radars was the insertion of an angle bias voltage into the angle tracking loop. This solved the noisy tracking situation and allowed the radar to select and track a single target, but it also produced an undesirable side effect which outweighed this advantage. Specifically, it was found that if the bias value selected was too large then only a very slight target fade would cause the radar to break track and seek another target, thereby making the radar even more unstable in a fading multiple target environment.

In accordance with the present invention it was discovered that the presence of multiple close-spaced targets within a beam width of a conical-scan radar causes the return signal to be phase modulated at the scan rate frequency and also causes an attendant second harmonic amplitude modulation at twice the scan rate frequency. By detecting these modulation components a signal can be generated to operate a multiple-target warning system. Moreover, since these modulation components both vanish from the radar return signal for a single target situation they are perfectly suited to provide a bias voltage which responds to changes in target reflectivity. Regardless of which modulation component is chosen to provide the adaptive bias signal, this characteristic must be extracted from the radar return signal without loss of any information from the return signal or signal degradation due to noise or other causes. In choosing which modulation component can best provide the required adaptive angle bias, various factors are involved. The phase modulation signal, being a first-order fundamental effect, has some advantage over the amplitude modulation signal which is a second harmonic, second-order effect, moreover, the probability exists that a second harmonic signal might be developed not only by the presence of multiple targets but also from non-linearities in the system, or even by over modulation due to clutter. On the other hand, an advantage in using the amplitude modulation signal is that it is normally more accessible and more readily extracted from the composite return signal. However, in a tracking radar which uses a Doppler frequency tracker or speedgate, of the type shown for example in U.S. Pat. No. 3,295,127, the phase modulation components becomes more readily accessible. When a radar is tracking with the speedgate locked, the phase modulation component can be easily recovered from an output signal of a phase detector which is part of the speedgate loop.

The phase modulation component of the composite return signal will be at the conical-scan rate frequency and will have the same phase angle as an amplitude modulation signal normally used to develop tracking angle errors when the multiple target situation is not present. In the first embodiment of the invention, once this phase modulated component has been recovered, a circuit similar to that used in the conventional radar angle error detector is employed. More specifically, once the signal has been recovered from the phase detector of the speedgate, it is filtered and fed into two synchronous detectors to develop the traverse and elevation angle bias components; this is similar to the signal division achieved in an error demodulator.

In a situation, however, when the radar is operating with the speedgate out of the circuit or in an unlocking condition and the angle error information is being retrieved by envelope detection, the phase modulation component is not readily accessible and is hence unavailable for biasing. In the second embodiment of the invention, the bias is developed from the second harmonic, amplitude modulation content of the return signal. Since this component is at twice the scan rate frequency, synchronous detection is performed by developing reference signals at twice the scan rate. The radar Doppler return is envelope detected in the normal manner, then fed through a paraphase amplifier which develops two anti-phase signals from the one original; i.e., each one 180° out of phase with the other. A paraphase amplifier is actually a phase-inverter which converts a single-ended signal to a push-pull signal.

Of course, the optimum tracking system would be equipped to detect both modulation components and to employ each one at the appropriate times, i.e., use the phase modulation component when the speedgate is locked and the amplitude modulation when the speedgate is out of the circuit and the angle error signal is being formed by envelope detection. On the other hand, the adaptive angle bias produced by the phase modulation component alone, as in the first embodiment of the invention, may be sufficient for most uses.

It is therefore an object of the present invention to provide a tracking radar with the capability of selecting and tracking one target from a formation of targets.

Another object of the present invention is to provide a radar that will not break track on a target when such target fades or changes reflectivity.

A further object of this invention is to provide a radar with a multiple target indicator for indicating when more than one target is present within a resolution cell.

Other objects, purposes and characteristic features of the present invention will in part be pointed out as the description of the present invention progresses and in part be obvious from the accompanying drawings, wherein.

DESCRIPTION OF THE PREFERRED EMBODIMENTS

Figure 1:
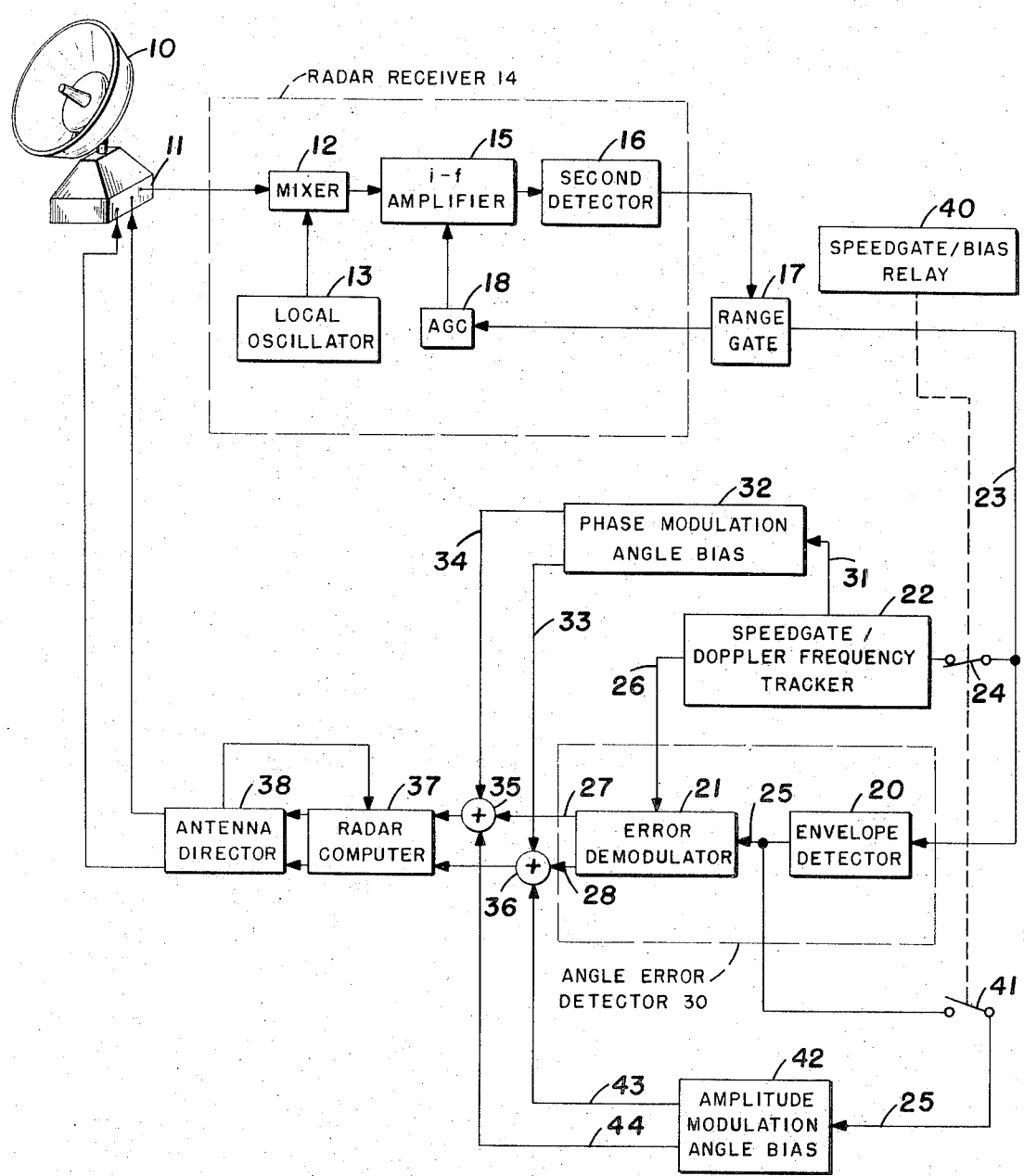
FIG. 1 is a block diagram of a tracking radar system incorporating an adaptive angle bias system according to one embodiment of the present invention.

Most pulsed radars, regardless of their application, make provision for display, synchronization, transmission and reception. Referring now to FIG. 1, which shows a tracking radar system employing an adaptive angle bias system, radar return signals are received by an antenna 10 which is connected to a radar control pedestal 11 containing servomotors and the like for controlling the tracking coordinates of the antenna 10. The radar return signal after being received by the antenna 10 is fed into a mixer 12 which also has another input signal provided by a local oscillator 13, to thus form the first detector of a standard radar receiver 14. The output signal of the mixer 12 is fed into an intermediate frequency amplifier 15 whose output is fed through a second detector 16 into a range gate 17 which helps the radar to establish a resolution cell. The range gate 17 also produces a signal which is fed into an automatic gain control 18 which provides a second input signal to the i-f amplifier 15 and thus completes an automatic gain control loop. The automatic gain control 18 then maintains the radar signal, selected by the range gate 17, at a constant amplitude when averaged over a period exceeding the scan cycle of the radar. The automatic gain control 18 thus provides consistent performance of the tracking loop regardless of target size or range by providing a signal of relative constant level.

The present invention involves an improvement applicable to an angle tracking loop of a radar, such tracking loop may consist of an envelope detector 20, an error demodulator 21 and a speedgate 22 or Doppler frequency tracker. The output signal 23 of range gate 17 is fed into the envelope detector 20, which is sensitive to the scan-rate components of signal modulation and rejects the D.C. level and all signal components at the repetition rate and above. The range gate output signal 23 is also fed through a relay actuated switch 24 to speedgate 22 which is also known as a Doppler frequency tracker and will be described in more detail hereinafter. The envelope detector output signal 25 and the speedgate output signal 26 are both fed into error demodulator 21 which resolves the error signal into a traverse component 27 and elevation component 28. The envelope detector 20 operating in conjunction with the error demodulator 21 constitutes the usual angle error detector 30 which produces alternating current voltages at the scan frequency and which are calibrated in terms of off-axis error. The speedgate 22 provides a convenient source for the radar return signal component which is phase modulated at the scan rate frequency when multiple targets are present within one resolution cell. This phase modulated signal is then fed by line 31 into a phase modulation angle bias system 32 which produces bias signals, appearing at lines 33 and 34, for the elevation and traverse angles, respectively. The traverse angle bias signal 34 is added, in the adder 35, to the traverse angle error signal 27 produced by the angle error detector system 30, likewise the elevation angle bias signal 33 is added, in adder 36, to the elevation angle error signal 28 produced by the angle error detector system 30. This addition of the traverse and elevation angle bias produced by the phase modulation angle bias system 32 is the bias necessary to allow the radar to track only one target in a formation of targets without breaking track due to target fade. The output signals created by the signal adders 35, 36 are fed into a standard radar computer 37 for producing signals which are fed into an antenna director 38. The antenna director 38 produces control signals which are sent back to the antenna pedestal 11 which contains the appropriate servomotors to position the antenna 10 so as to track only one target in a multiple target formation.

In the course of radar operations occasions arise when the speedgate 22 is not required in the track angle loop, in this case the phase modulated angle bias system 32 can not readily be used to produce the required bias signal. When this situation occurs a speedgate/bias relay 40, of a conventional type, will be actuated to open a switch 24 thereby removing the speedgate 22 from the circuit. Actuation of the relay 40 also closes switch 41 which inserts an amplitude modulation angle bias system 42 into the tracking loop. The envelope detector output signal 25 in addition to being fed into the error demodulator 21 is also fed into the amplitude modulation angle bias system 42 which produces, on lines 43 and 44 respectively, a bias signal for both the elevation and traverse angle. The traverse angle bias signal 44 is added, in adder 35, to the traverse angle error signal 27 produced by the angle error detector 30, likewise the elevation angle bias signal 43 is added, in adder 36, to the elevation angle error signal 28 produced by the angle error detector 30. This addition of the traverse and elevation angle biases, produced by the amplitude modulation angle bias 42 is the required bias voltage which allows the radar to track only one target in a formation of targets when the speedgate 22 is not being used in the tracking loop. As stated previously, the phase modulated signal fades when the reflectivity of the target being tracked decreases and, since the amplitude modulated signal is a second harmonic of the phase modulated signal, the resultant signals from the signal summers 35, 36 therefore represent adaptive angle bias voltages sufficient to cause the radar to select and track one of a multiple of targets, regardless of target fade.

Figure 2:
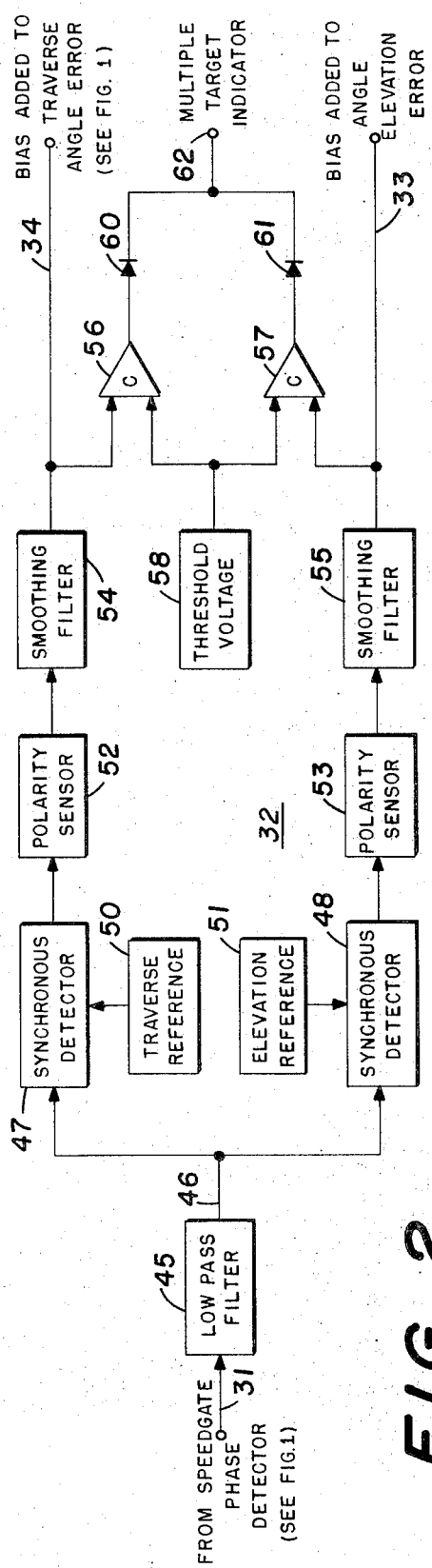
FIG. 2 is a block diagram of an adaptive angle bias system utilizing a phase modulation signal component, in accordance with the first embodiment of the present invention.

With reference to FIG. 2, a phase modulation adaptive angle bias system (32 in FIG. 1), in accordance with the present invention, is shown in greater detail. The input line 31 is connected to an output of a conventional phase detector found in the typical speedgate (designated at 22 in FIG. 1); the phase detected signal, which contains a multiple-target-indicating phase modulated component at the scan frequency, is fed through a low pass filter 45 which effectively removes any high frequency components. The low pass filter output signal 46 is then fed into two parallel channels, one to produce an adaptive angle bias to be added to a traverse angle error signal and one to produce an adaptive angle bias to be added to an elevation angle error signal, specifically, the filter outputs are fed into two conventional synchronous detectors 47, 48. The synchronous detector 47 has as its reference signal a traverse reference voltage 50 which serves to set the traverse angle error bias level; whereas, an elevation reference voltage 51 is applied to the other synchronous detector 48. These reference voltages serve to set the level at which the traverse and elevation bias voltages will be detected. The output signals from the synchronous detectors 47, 48 are fed into polarity sensors 52, 53 which detect positive or negative threshold crossings and thereby indicate the direction in which the bias will be applied; i.e., left/right traverse or up/down elevation. The signal in each channel is then fed into filters 54, 55 for smoothing the ripple in the signal so that only the D.C component is used for the required bias voltage, and the smoothing filter output signals 34, 33 are fed into comparators 56, 57. A threshold voltage 58 which is preset so that only signals above a specified level will indicate multiple targets, is fed into the comparators 56, 57 along with the outputs of the filters 54, 55 such that when the threshold voltage 58 is exceeded output signals are produced by the comparators 56, 57. The comparator output signals are passed through diodes 60, 61 before being fed to a multiple target indicator terminal 62. The output of the smoothing filter 54 in the traverse angle channel is fed by a traverse angle error bias line 34 and is added (by adder 35 of FIG. 1) to the traverse angle error signal 27 developed by the error detector system (30 of FIG. 1). The output signal of the smoothing filter 55 in the elevation angle channel is fed by an elevation angle error bias line 33 and is added (by adder 36 of FIG. 1) to the elevation angle error signal 28 developed by the error detector system (30 of FIG. 1).

Figure 3:
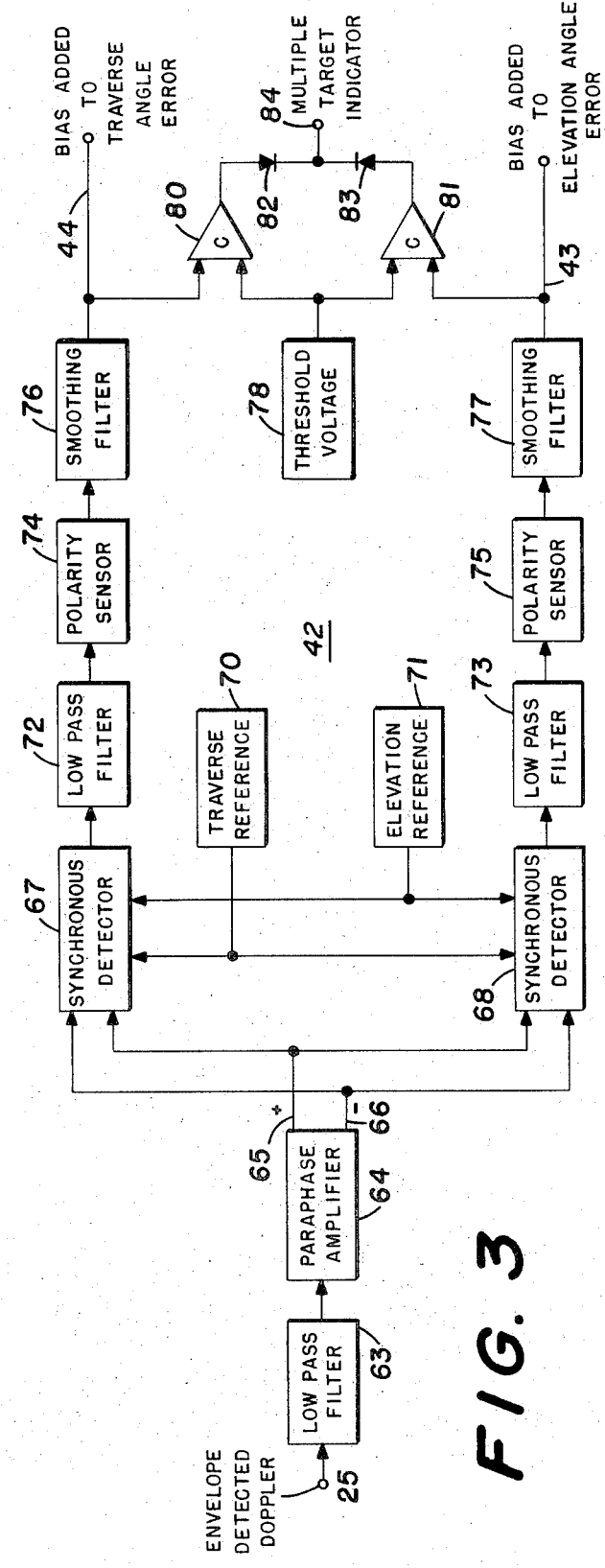
FIG. 3 is a block diagram of an adaptive angle bias system utilizing an amplitude modulation signal component, in accordance with the second embodiment of the present invention.

Referring to FIG. 3, a further, more detailed description of the amplitude modulation adaptive angle bias system of the present invention (42 in FIG. 1) is shown. An input line 25 is connected to the output of an envelope detector (20 in FIG. 1) in the angle error detector system 30 and supplies envelope detector Doppler radar signals to a low pass filter 63 whose output is fed to a typical paraphase amplifier 64 which produces amplified output signals 65, 66 that are equal in amplitude but 180° out of phase. The output signals 65, 66 from the paraphase amplifier 64 are both fed into two conventional synchronous detectors 67, 68, representing the traverse angle error bias channel and the elevation angle error bias channel. A traverse reference voltage 70 is fed into the two synchronous detectors 67, 68 and an elevation reference voltage 71 is also fed into the same two synchronous detectors 67, 68.

These reference voltages 70, 71 set the level which the traverse and elevation bias components must exceed before they will be detected. Since the amplitude modulation component is at twice the conical scan rate frequency, synchronous detection can not be performed by using the same reference voltages used in the phase modulation bias system, accordingly new references at twice the scan rate frequency must be developed. Two input signals 65, 66, developed by the paraphase amplifier 64, containing the amplitude modulated component must also be fed to each synchronous detector 67, 68 in the traverse bias and elevation bias channels. The two sets of input signals 65, 66 and reference signals 70, 71, fed into the synchronous detectors 67, 68, are required because the amplitude modulation component is a second harmonic of the phase modulation component of the radar return signal. Operation of synchronous detectors as used herein will be discussed in greater detail hereinafter. The output signals of the synchronous detectors 67, 68 are fed through low pass filters 72, 73 to remove high-frequency components from the signals, then fed into polarity sensors 74, 75 which detect the crossing of a positive or negative threshold and thus indicate in which direction the bias is to be applied, i.e., left/right traverse or up/down elevation. The signal in each channel is then fed through filters 76, 77 for smoothing the ripple in the signal so that only the D.C. component is used for the required angle bias voltage. A threshold voltage 78, which is preset so that only signals above a specified level will indicate multiple targets, is fed into two comparators 80, 81 along with the output signals 44, 43 from the smoothing filters 76, 77 such that when the threshold voltage 78 is exceeded, an output signal is produced by the appropriate comparator. The output signals from the comparators 80, 81 are passed through diodes 82, 83 before being fed to a multiple target indicator terminal 84 which then may be used to sound an alarm or alert the radar operator. The output of the smoothing filter 76 in the traverse angle channel is fed by a traverse angle bias line 44 and is added by adder 35 of FIG. 1 to the traverse angle error signal 27 developed by the error detector, 30 of FIG. 1, of the radar. The output of the smoothing filter 77 in the elevation angle channel is fed by an elevation angle bias line 43 and is added by adder 36 of FIG. 1 to the elevation angle error signal 28 developed by the error detector, 30 of FIG. 1.

Figure 4:
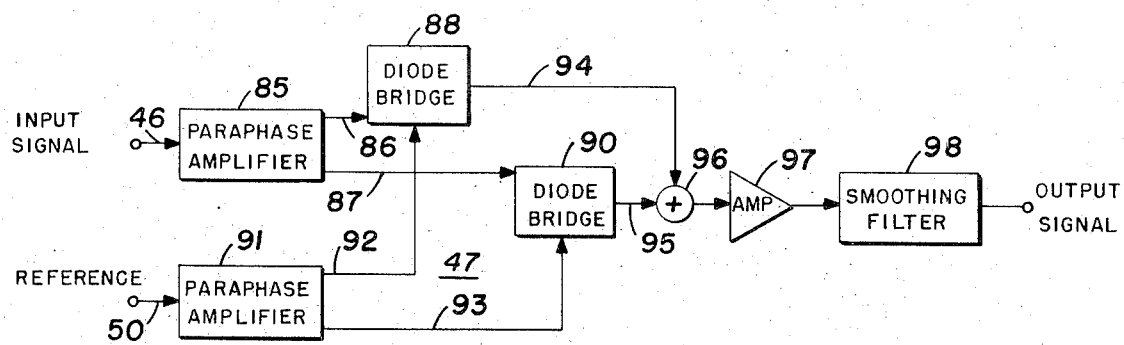
FIG. 4 is a block diagram of a typical synchronous detector.

With reference to FIG. 4 which shows a typical synchronous detector, such as represented at 47 or 48 in FIG. 2, in detail, an input signal, such as 46 in FIG. 2, is fed into a paraphase amplifier 85 whose amplified output signals 86, 87 represent the input signal reproduced 86 and the input signal inverted 87. One output signal 86 is fed to a diode bridge 88 and the other representing the inverted input signal 87 is fed to another diode bridge 90. A reference signal, such as 50 in FIG. 2, which may be either a sine or a cosine wave, is fed to another paraphase amplifier 91 whose amplified output signals represent the reference signal reproduced 92 and the reference signal inverted 93. The reference signal 92 is fed to the first diode bridge 88 and the inverted reference signal 93 is fed to the second diode bridge 90. The output signals 94, 95 from the two diode bridges 88, 90 are then summed in a signal adder 96, amplified by an operational amplifier 97 and then fed through a smoothing filter 98 to remove any ripple in the output signal. A synchronous detector is sensitive only to signals at or near a given, preselected frequency; normally this given frequency will be a control or reference frequency supplied independently, e.g., that designated at 50 in FIG. 4. The operation of a synchronous detector is such that during the positive portion of the sine or cosine reference signal the first diode bridge 88 is biased ON so that it passes the input signal, during the negative portion of the reference signal the second diode bridge 90 is biased ON so that the inverted input signal is passed. The two diode bridge signals 94, 95 are then summed and smoothed (the ripple is removed), as previously noted, with the output of the synchronous detector being a signal having a voltage level proportional to the amount of reference frequency present in the input signal.

Figure 5:
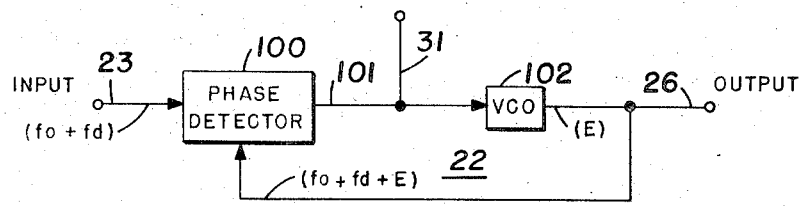
FIG. 5 is a block diagram of a typical speedgate or Doppler frequency tracker.

FIG. 5 shows in detail a typical speedgate or Doppler frequency tracker such as that represented at 22 in FIG. 1. A speedgate is a phase locked loop which locks onto a selected frequency of an input signal. An input signal, such as represented at 23 in FIG. 1, made up of the Doppler frequency $f_d$ of the target, offset by the operating frequency $f_o$ of the loop, is fed into a phase detector 100 whose output signal 101 is fed into a voltage controlled oscillator 102. The output signal of the voltage controlled oscillator 102, which is the output signal 26 of the speedgate, is fed back to the phase detector 100 which detects any difference between the output signal 26 of the voltage controlled oscillator 102 and the input signal 23. When the voltage controlled oscillator 102 reaches the correct frequency, the output of the phase detector 100 goes to zero. If the input signal 23 is phase modulated, as it would be if multiple targets were present within a radar beamwidth, the output signal 26 of the loop lags the input signal 23 and a signal proportional to the amount of phase modulation shows up as the output signal from phase detector 100. In order to make this phase detector output signal 101 available for utilization by the adaptive angle bias system, such as represented at 32 in FIG. 1, an output line 31 is provided to accomplish the required connection.

Various other modifications, adaptations, and alterations are of course possible in light of the above teachings. It should therefore be understood at this time that within the scope of the appended claims the invention may be practiced otherwise than as specifically described hereinabove.

What is claimed is:

1. In a radar of the sequential lobe type wherein a radar signal is transmitted and received by antenna means, and the received radar signal is a composite signal containing a phase modulated signal component caused by multiple targets occurring within one radar beamwidth, a multiple target indicator comprising,
   detection means connected to said composite signal for producing an output signal derived from said phase modulated signal component, and
   indicating means connected to receive said detecting means output signal and producing a signal indicative of the presence of muultiple targets.

2. The apparatus of claim 1 wherein said sequential lobe radar includes means for producing a signal representative of a tracking angle error and further including,
   means connected to receive said detection means output signal for producing a tracking angle error bias signal, multiple
   signal adding means for producing an output signal representing the sum of said tracking angle error bias signal and said tracking angle error signal, and antenna positioning means responsive to said signal adding means output signal for positioning said antenna means so that said radar tracks only one of said multiple targets.

3. The apparatus of claim 1 wherein said sequential lobe radar includes means responsive to said composite radar signal and producing therefrom a first output signal representative of traverse tracking angle error and a second output signal representative of elevation tracking angle error,
   wherein said detection means comprises first synchronous detection means producing a traverse angle error bias output signal and second synchronous detection means producing an elevation angle error bias output signal, and further including,
   first signal adding means connected to receive and add together said traverse tracking angle error signal and said traverse angle error bias signal for producing an output signal,
   second signal adding means connected to receive and add together said elevation tracking angle error signal and said traverse angle error bias signal for producing an output signal, and
   antenna positioning means responsive to the output signals from said first and second signal adding means output signal for positioning said antenna means so that said radar tracks only one of said multiple targets.

4. The apparatus of claim 3 wherein said means producing a first and second tracking angle error signal includes a Doppler frequency tracker containing a phase detector connected to receive said composite signal and an oscillator responsive to output signals from said phase detector, said oscillator producing output signals which are fed back to said phase detector and said phase detector output signal representing a phase difference between said oscillator output signal and said composite signal and further including,
   an interconnection between said phase detector output signal and said first and second synchronous detection means for providing an input signal representing said phase modulation component to said first and second synchronous detection means.

5. In a radar of the sequential lobe type wherein a radar signal is transmitted and received by antenna means, and the received radar signal is a composite signal containing an amplitude modulated signal component cause by multiple targets occurring within one radar beamwidth, a multiple target indicator, comprising first detection means connected to said composite signal for producing an output signal derived from said amplitude modulated signal component, and indicating means connected to receive said first detection means output signal for producing a signal indicative of the presence of multiple targets.

6. The apparatus of claim 5 wherein said sequential lobe radar includes means for producing a signal representative of a tracking angle error and further including, means connected to receive said first detection means output signal for producing a tracking angle error bias signal, signal adding means for producing an output signal representing the sum of said tracking angle error bias signal and said tracking angle error signal, and antenna positioning means responsive to said signal adding means output signal for positioning said antenna means so that said radar tracks only one of said multiple targets.

7. The apparatus of claim 5 wherein said sequential lobe radar includes means responsive to said composite radar signal and producing therefrom a first output signal representative of tracking angle error and a second output signal representative of elevation tracking angle error, wherein said first detection means comprises, paraphase amplifier means connected to receive said composite signal producing first and second output signals, said first and second signals being in an anti-phase relationship, first synchronous detection means connected to receive said first and second paraphase amplifier output signals producing a traverse angle error bias signal, and second synchronous detection means connected to receive said first and second paraphase amplifier output signals producing an elevation angle error bias signal, and further including, first signal adding means connected to receive and add said traverse tracking angle error signal and said traverse tracking angle bias signal for producing an output signal, second signal adding means connected to receive and add said elevation tracking angle error signal and said elevation tracking angle bias signal for producing an output signal, and antenna positioning means responsive to the output signals from said first and second signal adding means output signal for positioning said antenna means so that said radar tracks only one of said multiple targets.

8. The apparatus of claim 7 wherein said means producing first and second tracking angle error signals includes an envelope detector and further including, an interconnection between said envelope detector and said paraphase amplifier for providing said amplitude modulated signal component to said paraphase amplifier.

9. The apparatus of claim 5 wherein said composite radar signal also contains a phase modulated signal component caused by multiple targets occurring within one radar beamwidth and further including, second detection means connected to said composite signal for producing an output signal when the presence of said phase modulated signal component is detected in said composite signal, and indicating means connected to receive said second detection means output signal for producing a signal indicative of the presence of multiple targets.

10. The apparatus of claim 9, wherein said sequential lobe radar includes means responsive to said composite signal for producing therefrom a signal representative of a tracking angle error and further including, means connected to receive the output signal from said first detection means for producing a tracking angle error bias signal derived from said amplitude modulated signal component, means connected to receive the output signal from said second detection means for producing a tracking angle error bias signal derived from said phase modulated signal component, switching means having an input connected to receive said composite signal and having a first output connected to said first detection means and a second output connected to said second detection means for selectively connecting said input to one or the other of said first and second outputs, signal adding means for producing an output signal representing the sum of said tracking angle error bias signal and said switching means output signal, and antenna positioning means responsive to said signal adding means output signal for positioning said antenna means so that said radar tracks only one of said multiple targets.

* * * * *